(12) United States Patent
Ji

(10) Patent No.: US 10,473,972 B2
(45) Date of Patent: Nov. 12, 2019

(54) POLARIZATION SWITCHING DEVICE AND ITS DRIVING METHOD, AND CORRESPONDING DISPLAY APPARATUS

(71) Applicant: BOE TECHNOLOGY GROUP CO., LTD., Beijing (CN)

(72) Inventor: Chunyan Ji, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/574,244

(22) PCT Filed: Jun. 6, 2017

(86) PCT No.: PCT/CN2017/087287
§ 371 (c)(1),
(2) Date: Nov. 15, 2017

(87) PCT Pub. No.: WO2018/028285
PCT Pub. Date: Feb. 15, 2018

(65) Prior Publication Data
US 2018/0231835 A1 Aug. 16, 2018

(30) Foreign Application Priority Data

Aug. 12, 2016 (CN) .......................... 2016 1 0665598

(51) Int. Cl.
*G02F 1/1335* (2006.01)
*G02F 1/133* (2006.01)
(Continued)

(52) U.S. Cl.
CPC ...... *G02F 1/133528* (2013.01); *G02F 1/0136* (2013.01); *G02F 1/1343* (2013.01);
(Continued)

(58) Field of Classification Search
CPC .. G02F 1/13306; G02F 1/1343; G02F 1/0136; G09G 3/36; G09G 2310/0264;
(Continued)

(56) References Cited

U.S. PATENT DOCUMENTS 6,115,014 A * 9/2000 Aoki .................... G09G 3/3607
345/88
7,015,997 B2 * 3/2006 Choi ...................... B82Y 20/00
349/114
(Continued)

FOREIGN PATENT DOCUMENTS

CN 204807880 U 11/2015
CN 205176423 U 4/2016
(Continued)

OTHER PUBLICATIONS

Search Report for International Chinese Patent Application No. PCT/CN2017/087287 dated Jul. 28, 2017.

*Primary Examiner* — Sejoon Ahn
(74) *Attorney, Agent, or Firm* — Calfee, Halter & Griswold LLP

(57) ABSTRACT

The present disclosure relates to the field of display technology. In particular, a polarization switching device, a display apparatus comprising such a device, and a driving method for such a device are disclosed. Thereby, problems are solved, such as a reduced user experience due to the existing display apparatus incapable of switching the viewing angle range. By disposing the first and second conductive layers in the confined space of such a device, and controlling voltages for the first and second conductive layers, this application can change the size and the direction of the electric field in the confined space. As such, the long axis of the one-dimensional nanometer conductive material (Continued)

located in the confined space can be arranged along the direction of the electric field, so as to form a grating.

14 Claims, 6 Drawing Sheets

(51) Int. Cl.
    *G02F 1/1343* (2006.01)
    *G02F 1/01* (2006.01)
    *G09G 3/36* (2006.01)

(52) U.S. Cl.
    CPC ........... *G02F 1/13306* (2013.01); *G09G 3/36* (2013.01); *G09G 2300/023* (2013.01); *G09G 2310/0264* (2013.01); *G09G 2320/028* (2013.01); *G09G 2358/00* (2013.01)

(58) Field of Classification Search
    CPC ....... G09G 2300/023; G09G 2320/028; G09G 2358/00
    See application file for complete search history.

(56) References Cited

U.S. PATENT DOCUMENTS

| | | | | |
|---|---|---|---|---|
| 2004/0109107 A1* | 6/2004 | Roes | ...................... | G02F 1/1334 349/86 |
| 2004/0165128 A1* | 8/2004 | Vithana | ................. | G02F 1/1393 349/113 |
| 2006/0098140 A1* | 5/2006 | Lee | ...................... | G02B 5/3058 349/98 |
| 2006/0146250 A1* | 7/2006 | Wu | ....................... | G02F 1/1323 349/141 |
| 2007/0237906 A1* | 10/2007 | Li | ..................... | G02F 1/133305 428/1.2 |
| 2008/0002105 A1* | 1/2008 | Park | .................. | G02F 1/133526 349/95 |
| 2008/0068359 A1* | 3/2008 | Yoshida | ............... | G09G 3/3406 345/204 |
| 2008/0170189 A1* | 7/2008 | Naka | ................. | G02F 1/133504 349/113 |
| 2008/0218469 A1* | 9/2008 | Kwok | .................. | G09G 3/3622 345/102 |
| 2008/0252612 A1* | 10/2008 | Yu | ........................... | G06F 3/045 345/173 |
| 2010/0302481 A1* | 12/2010 | Baum | .............. | B29D 11/00634 349/96 |
| 2012/0249928 A1* | 10/2012 | Kaihoko | ............... | G02B 5/3083 349/69 |
| 2013/0107177 A1* | 5/2013 | Kang | ................. | H04N 13/0404 349/102 |
| 2014/0140653 A1* | 5/2014 | Brown | ................. | G02B 6/0033 385/10 |
| 2014/0140654 A1* | 5/2014 | Brown | ...................... | G02F 1/29 385/10 |
| 2014/0355101 A1* | 12/2014 | Shian | ....................... | G02B 3/12 359/290 |
| 2015/0035873 A1* | 2/2015 | Shima | ................ | G02B 27/2214 345/690 |
| 2016/0192483 A1* | 6/2016 | Shin | ........................ | H05K 1/09 174/268 |
| 2016/0306208 A1* | 10/2016 | Hayashi | .............. | G02F 1/13338 |

FOREIGN PATENT DOCUMENTS

| | | |
|---|---|---|
| CN | 205176436 U | 4/2016 |
| CN | 205263429 U | 5/2016 |
| CN | 106054441 A | 10/2016 |
| CN | 205899192 U | 1/2017 |
| KR | 20130031178 A | 3/2013 |

\* cited by examiner

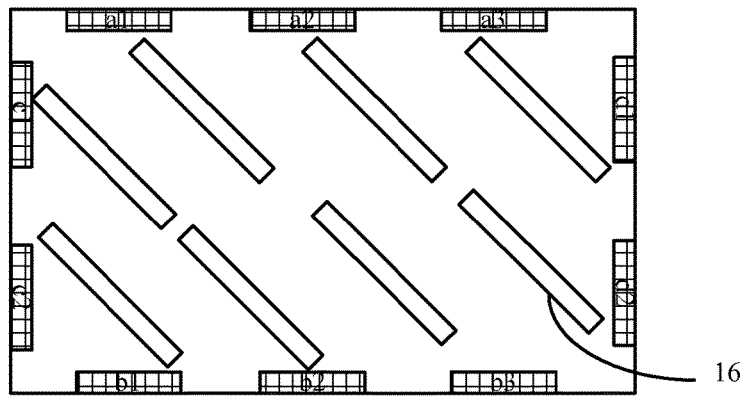
Fig. 6(d)
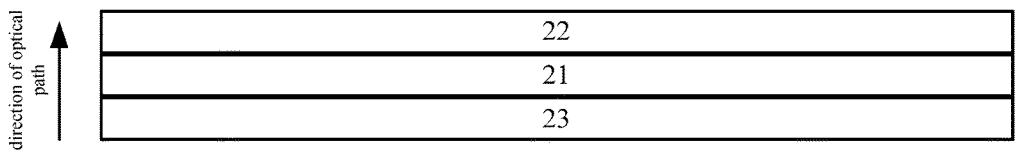
Fig. 7
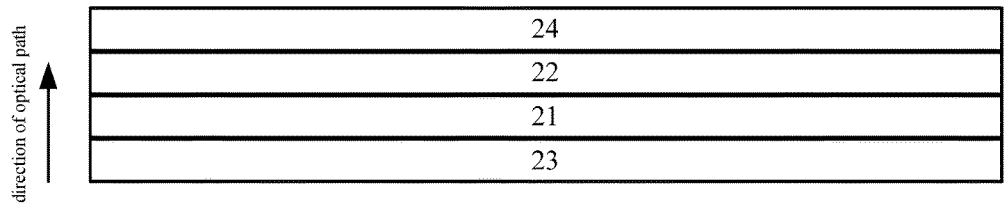
Fig. 8
adjust voltages for the first conductive layer and the second conductive layer, such that a parallel electric field is generated in the confined space — 31
deflect the long axis of the one-dimensional nanometer conductive material in the confined space by changing the direction of the electric field — 32
Fig. 9

POLARIZATION SWITCHING DEVICE AND ITS DRIVING METHOD, AND CORRESPONDING DISPLAY APPARATUS

The present application is the U.S. national phase entry of PCT/CN2017/087287, with an international filing date of Jun. 6, 2017, which claims the benefit of priority from the Chinese patent application No. 201610665598.5 filed on Aug. 12, 2016, the disclosures of which are incorporated herein by reference.

FIELD

The present disclosure relates to the field of display technology, and describes a polarization switching device, a display apparatus comprising such a device, and a driving method for such a device.

BACKGROUND

In recent years, people have started to use electronic display products more and more frequently, such as mobile phones, pads, etc., to meet needs of entertainment or work, etc. Since the viewing angle range of an electronic display product is wide, problems such as privacy leakage will inevitably take place in public places.

Nowadays, to meet people's need for privacy protection, there have been proposed some anti-peeping techniques in the industry. For example, a polymer diaphragm with the anti-peeping function is integrated in existing electronic display products. Alternatively, the angle transformation of the absorption axis of a polarizer and the design of a compensation film is utilized in combination to achieve the anti-peeping function. However, once used, such an anti-peeping design cannot cause the electronic display products to be recovered to the original range of normal viewing angle. This brings inconvenience to user's normal use, and thereby reduces the user experience.

SUMMARY

Embodiments of the present disclosure provide a polarization switching device, a display apparatus comprising such a device, and a driving method for such a device, to solve problems such as a reduced user experience due to the existing display apparatus incapable of switching the viewing angle range.

According to an aspect of the present disclosure, there is provided a polarization switching device. The polarization switching device comprises: a first transparent substrate; a second transparent substrate disposed opposite to the first transparent substrate; four side-plates enclosing a confined space together with the first transparent substrate and the second transparent substrate; a first conductive layer and a second conductive layer disposed on an inner surface of at least one of the first transparent substrate, the second transparent substrate and the four side-plates; transparent polymer fluid filled in the confined space; and one-dimensional nanometer conductive material dispersed in the transparent polymer fluid. In particular, the first conductive layer and the second conductive layer are configured to generate a parallel electric field in the confined space. In addition, the long axis of the one-dimensional nanometer conductive material is deflected as the direction of the electric field changes in the confined space.

When the direction of the electric field changes in the polarization switching device, a one-dimensional grating will be formed since the long axis of the one-dimensional nanometer conductive material is arranged along the direction of the electric field. When light is incident, the light perpendicular to the long axis direction of the one-dimensional nanometer conductive material may transmit, whereas the light in other directions will be absorbed. As such, by adjusting the direction of the electric field in the polarization switching device, switching between different polarization directions may be achieved.

In certain exemplary embodiments, the polarization switching device further comprises: an electrical interface; as well as a first control terminal and a second control terminal connected with the electrical interface. Further, the first control terminal is configured to control the first conductive layer via the electrical interface, and the second control terminal is configured to control the second conductive layer via the electrical interface.

Using this scheme, the first and second conductive layers as well as the corresponding first and second control terminals can be utilized to control and switch the direction of the electric field in the confined space. Thereby, switching between a plurality of polarization directions is achieved flexibly.

In certain exemplary embodiments, the first conductive layer comprises a plurality of first block electrodes, and the plurality of first block electrodes are arranged in four edge regions on the inner surface of the first transparent substrate. Further, in certain exemplary embodiments, the second conductive layer comprises a plurality of second block electrodes, and the plurality of second block electrodes are arranged in four edge regions on the inner surface of the second transparent substrate.

In this scheme, by disposing corresponding block electrodes in four edge regions on a surface of a corresponding substrate, switching between a plurality of directions of the electric field in the confined space can be achieved by means of a corresponding control terminal. In turn, switching between a plurality of polarization directions is achieved.

In certain exemplary embodiments, the orthographic projection of each first block electrodes on the second transparent substrate coincides with a corresponding second block electrodes. By this scheme, it can be ensured that the direction of the electric field formed by the conductive layers of the upper and lower substrates is uniform and consistent.

In certain exemplary embodiments, materials for both the first and second block electrodes are chosen as transparent conductive materials. By this scheme, the transmittance can be improved.

In certain exemplary embodiments, in a case where a conductive layer is disposed on the surface of the first transparent substrate or the surface of the second transparent substrate, thicknesses of the first block electrodes are in a range of 45 nm-55 nm along a direction perpendicular to the surface of the first transparent substrate. In addition, in a direction parallel to the surface of the first transparent substrate, widths of edge regions occupied by the first block electrodes are in a range of 35 nm-45 nm. By this scheme, it can be possible to avoid occupying excessive edge regions and thereby improve the transmittance.

In certain exemplary embodiments, in a case where conductive layers are disposed on both the first transparent substrate and the second transparent substrate, thicknesses of the first block electrodes and the second block electrodes are in a range of 25 nm-35 nm along a direction perpendicular to the surface of the first transparent substrate. In addition, in a direction parallel to the surface of the first transparent substrate, widths of edge regions occupied by the first block electrodes and the second block electrodes are both in a range of 35 nm-45 nm. By this scheme, it can be possible to avoid occupying excessive edge regions and thereby improve the transmittance.

In certain exemplary embodiments, the four side-plates are divided into two pairs, and two side-plates of each pair are opposite to each other. Additionally, the first conductive layer comprises a plurality of first block electrodes and the plurality of first block electrodes are arranged on the inner surfaces of two opposite side-plates. Further, the second conductive layer comprises a plurality of second block electrodes and the plurality of second block electrodes are arranged on the inner surfaces of the other two opposite side-plates.

In this scheme, the block electrodes are disposed on the side-plates. In such a case, on one hand, switching between a plurality of directions of the electric field in the confined space can be achieved by the control terminals, and then switching between a plurality of polarization directions are allowed; and on the other hand, it is unnecessary to occupy a surface region of a substrate, and the transmittance of light is improved.

In certain exemplary embodiments, the plurality of first block electrodes is arranged on the inner surfaces of one and the other of two opposite side-plates in a symmetrical manner. Similarly, the plurality of second block electrodes is arranged on the inner surfaces of one and the other of the other two opposite side-plates in a symmetrical manner. This scheme can ensure that the direction of the formed electric field is uniform and consistent, and it is also convenient to adjust the direction of the electric field.

In certain exemplary embodiments, heights of the first block electrodes and the second block electrodes are both in a range of 45 nm-55 nm in a direction perpendicular to the surface of a side-plate. By this scheme, it can be possible to avoid occupying excessive edge regions and thereby improve the transmittance.

In certain exemplary embodiments, the thickness of the confined space is in a range of 80 nm-100 nm in a direction perpendicular to the surface of the first transparent substrate. Such a range of thickness may ensure a reasonable deflection of the one-dimensional nanometer conductive material, and may allow a relatively thin thickness of the polarization switching device.

In certain exemplary embodiments, the one-dimensional nanometer conductive material is selected as metal nanowire or carbon nanotube. This material may ensure that light perpendicular to the direction of the long axis transmits, whereas light parallel to the direction of the long axis is absorbed.

In certain exemplary embodiments, the one-dimensional nanometer conductive material is columnar. In addition, the diameter of the one-dimensional nanometer conductive material is in a range of 50 nm-70 nm. By this scheme, it can be ensured that a layer of one-dimensional nanometer conductive material is tiled in the confined space, to effectively control the formation of the grating structure.

In certain exemplary embodiments, the direction of the electric field in the confined space changes in a range of 0°-180° in a plane parallel to the surface of the first transparent substrate. By this scheme, it can be ensured that the direction of the electric field in the confined space can be changed in a larger range. Therefore, the light transmission angle of the polarization switching device is also in a large range.

According to another aspect of the present disclosure, there is provided a display apparatus comprising a liquid crystal display panel and two polarization switching devices. In particular, one of the two polarization switching devices is located on the light output surface of the liquid crystal display panel, and the other is located on the light input surface of the liquid crystal display panel. In this display apparatus, switching between different ranges of viewing angle may be done as desired.

In certain exemplary embodiments, the display apparatus further comprises: a viewing angle compensation film disposed on the outer surface of any of the polarization switching devices. By this scheme, the phase change of tilted light when transmitting through the liquid crystal cell can be effectively compensated. Thereby, the purpose of reducing light leakage in dark state is achieved.

In certain exemplary embodiments, angle settings for the two polarization switching devices are selected as one of the following: the polarization switching device located on the light output surface allows transmission of light with a polarization angle of 15°, whereas the polarization switching device located on the light input surface allows transmission of light with a polarization angle of 105°; the polarization switching device located on the light output surface allows transmission of light with a polarization angle of 165°, whereas the polarization switching device located on the light input surface allows transmission of light with a polarization angle of 75°; the polarization switching device located on the light output surface allows transmission of light with a polarization angle of 0°, whereas the polarization switching device located on the light input surface allows transmission of light with a polarization angle of 90°; and the polarization switching device located on the light output surface allows transmission of light with a polarization angle of 45°, whereas the polarization switching device located on the light input surface allows transmission of light with a polarization angle of 135°. In the above description, the polarization angle refers to a polarization angle in a plane parallel to the surface of the first transparent substrate. By this scheme, it is possible to flexibly implement applications in various scenarios, especially switching between the anti-peeping viewing angle and the conventional viewing angle.

According to still another aspect of the present disclosure, there is provided a driving method for a polarization switching device as described above. The driving method comprises: adjusting voltages for the first conductive layer and the second conductive layer, such that a parallel electric field is generated in the confined space; and deflecting the long axis of the one-dimensional nanometer conductive material in the confined space by changing the direction of the electric field.

In certain exemplary embodiments, the step of adjusting voltages for the first conductive layer and the second conductive layer specifically comprises: switching between different voltage ports for the first conductive layer and the second conductive layer via the control terminals, or adjusting the voltages for the first conductive layer and the second conductive layer via the control terminals. In this scheme, by adjusting voltages in the confined space, it is possible to flexibly adjust the arrangement direction of the one-dimensional nanometer material, and then flexibly adjust the polarization direction of light transmitting through the polarization switching device.

BRIEF DESCRIPTION OF THE DRAWINGS

In order to illustrate the technical solutions in embodiments of the present disclosure more clearly, the appended drawings used in the description of the embodiments will be introduced briefly in the following. Obviously, the drawings in the following description are only some embodiments of the present disclosure. For those of ordinary skills in the art, other drawings may also be obtained according to these drawings under the premise of not paying out creative work.

FIG. 6(d) is a structure diagram for an arrangement of the one-dimensional nanometer conductive material in the confined space along the electric field in FIG. 6(c);

FIG. 7 is a schematic diagram for a display apparatus according to an embodiment of the present disclosure;

FIG. 8 is a schematic diagram for a display apparatus according to another embodiment of the present disclosure; and FIG. 9 is a flow chart for the steps of a driving method for a polarization switching device according to an embodiment of the present disclosure.

DETAILED DESCRIPTION OF THE EMBODIMENTS

In order to make objects, technical solutions and advantages of the present disclosure clearer, in the following, the present disclosure will be further described in detail in conjunction with the drawings. Obviously, the described embodiments are only part of the embodiments of the present disclosure, and not all the embodiments. Based on the embodiments in the present disclosure, all the other embodiments obtained by those of ordinary skills in the art under the premise of not paying out creative work pertain to the scope protected by the present disclosure.

In the following, the technical solutions involved in the present disclosure will be described in detail by using specific embodiments. However, the present disclosure comprises, but is not limited to, the following embodiments.

Figure 1:
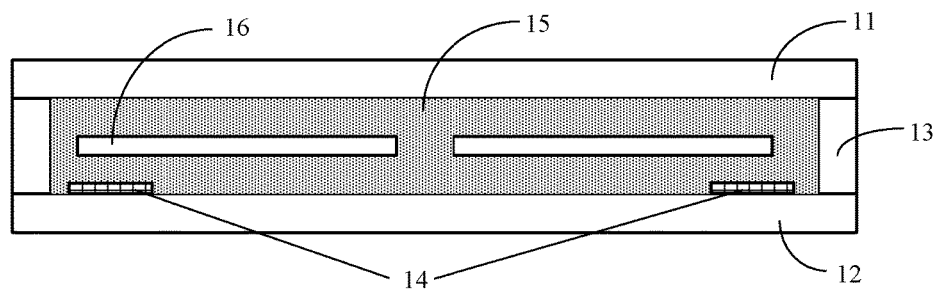
FIG. 1 is a structure diagram for a polarization switching device according to an embodiment of the present disclosure.

FIG. 1 shows a structure diagram for a polarization switching device according to an embodiment of the present disclosure. The polarization switching device mainly comprises: a first transparent substrate 11 located on the light input side; a second transparent substrate 12 disposed opposite to the first transparent substrate 11 and located on the light output side; four side-plates 13 enclosing a confined space together with the first transparent substrate 11 and the second transparent substrate 12; a first conductive layer and a second conductive layer 14 disposed on the inner surface of at least one of the first transparent substrate, the second transparent substrate and the four side-plates; transparent polymer fluid 15 filled in the confined space; and one-dimensional nanometer conductive material 16 dispersed in the transparent polymer fluid 15. In particular, the first conductive layer and the second conductive layer are configured to generate a parallel electric field in the confined space. In addition, the long axis of the one-dimensional nanometer conductive material 16 is deflected as the direction of the electric field changes in the confined space.

In this technical scheme, a grating will be formed since the long axis of the one-dimensional nanometer conductive material is arranged along the direction of the electric field. When light is incident, the light perpendicular to the long axis direction of the one-dimensional nanometer conductive material may transmit, whereas the light in other directions will be absorbed. As such, by adjusting the direction and size of the electric field in the confined space of the polarization switching device, switching between different polarization directions may be achieved.

It should be noted here that, the side-plates 13 involved may be a side-plate with four sides, which is formed by one sheet by enclosure. Alternatively, the side-plates 13 involved may be four side-plates. The specific implementation will not be defined.

Figure 2:
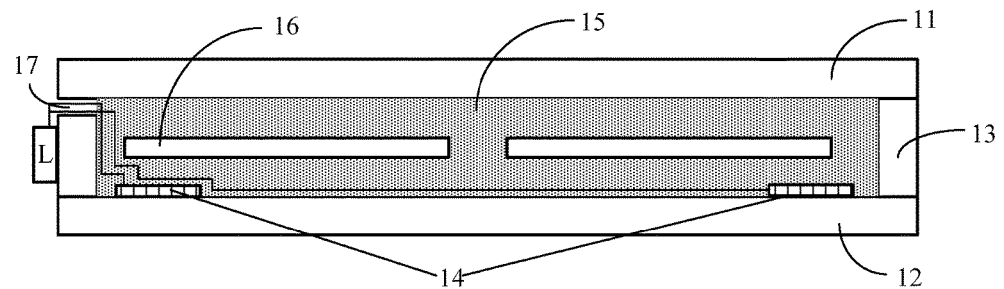
FIG. 2 is a structure diagram for a polarization switching device according to another embodiment of the present disclosure.

In certain exemplary embodiments, with reference to FIG. 2, the polarization switching device further comprises: a first electrical interface and a second electrical interface 17 disposed at any position of the confined space and connected with a control terminal; and the first conductive layer and the second conductive layer 14 are connected with the control terminal L via the two electrical interfaces 17. In addition, an electric field parallel to the surface of the first transparent substrate 11 and identical to a preset light transmission direction is generated by switching of the control terminal L. In particular, the electrical interface is generally an outlet, and lead wires connecting individual block electrodes are led to the outlet. In addition, the outlet is eventually connected to the control terminal.

As a specific example, the control terminal L is a control chip for the polarization switching device, which may be integrated on the outer surface of the polarization switching device. For example, the control terminal L may be disposed on the outer surface of a side-plate. The control terminal L is used for voltage control of a connected conductive layer. The specific control manner may be selected according to the distribution of the conductive layer.

In an embodiment of the present disclosure, the light transmission direction of the polarization switching device may be precisely controlled by selecting an appropriate electrical control terminal, parameters such as the frequency of the electric field and the fluid concentration, etc. In particular, the fluid concentration refers to the concentration ratio of the one-dimensional nanometer conductive material in the transparent polymer fluid. It may be for example 1-3 µg/ml. The arrangement orderliness of the one-dimensional nanometer conductive material is affected by the frequency of the electric field. In particular, the larger the frequency of the electric field, the better the arrangement orderliness is; otherwise, the poorer the arrangement orderliness is. In general, if the frequency of the electric field is in a range of 5-10 MHz, the arrangement orderliness of the one-dimensional nanometer conductive material is relatively high. The motion rate of the one-dimensional nanometer conductive material is affected by the size (i.e., the voltage) of the electric field. The larger the voltage, the greater the motion rate is. In particular, the present disclosure takes a voltage of 10-15 volts as an example.

In an embodiment of the present disclosure, the distribution and position of the conductive layers on an inner wall of the confined space may contain various design modes.

According to an implementation, the first conductive layer comprises a plurality of first block electrodes, and the plurality of first block electrodes are arranged in four edge regions on the inner surface of the first transparent substrate. Further, the second conductive layer comprises a plurality of second block electrodes, and the plurality of second block electrodes are arranged in four edge regions on the inner surface of the second transparent substrate.

Figure 3A:
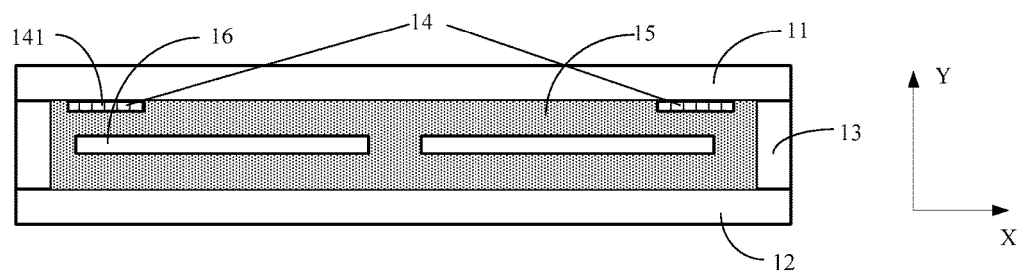
FIGS. 3(a)-(c) are structure diagrams for three settings of conductive layers in a polarization switching device according to embodiments of the present disclosure.

In particular, with reference to FIG. 3(a), in the polarization switching device, the conductive layer 14 disposed on an inner wall of the confined space contains a plurality of block electrodes 141. In particular, the conductive layer 14 is only arranged on the surface of the first transparent substrate 11. In this case, these block electrodes 141 are only arranged in four edge regions on the surface of the first transparent substrate 11.

Figure 3B:
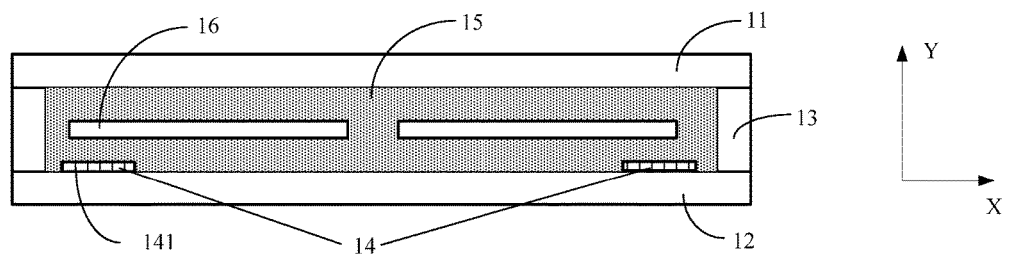

Alternatively, with reference to FIG. 3(b), the conductive layer 14 is only arranged on the surface of the second transparent substrate 12. The block electrodes 141 are arranged in four edge regions on the surface of the second transparent substrate 12.

Figure 3C:
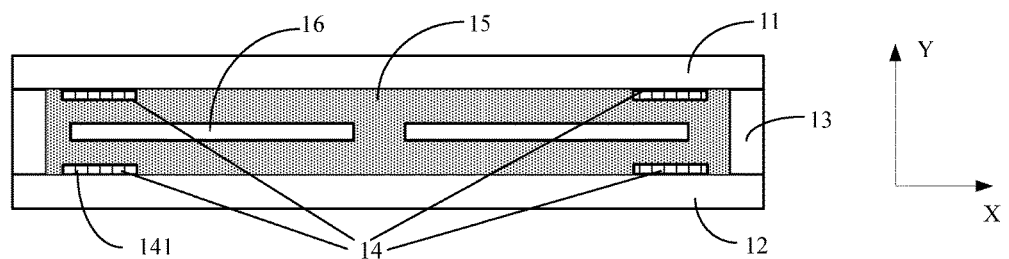

Further alternatively, with reference to FIG. 3(c), a part of the conductive layer 14 is arranged on the surface of the first transparent substrate 11, and another part is arranged on the surface of the second substrate 12. That is, the block electrodes 141 are arranged in four edge regions on the surface of the first transparent substrate 11 and four edge regions on the surface of the second transparent substrate.

Figure 4A:
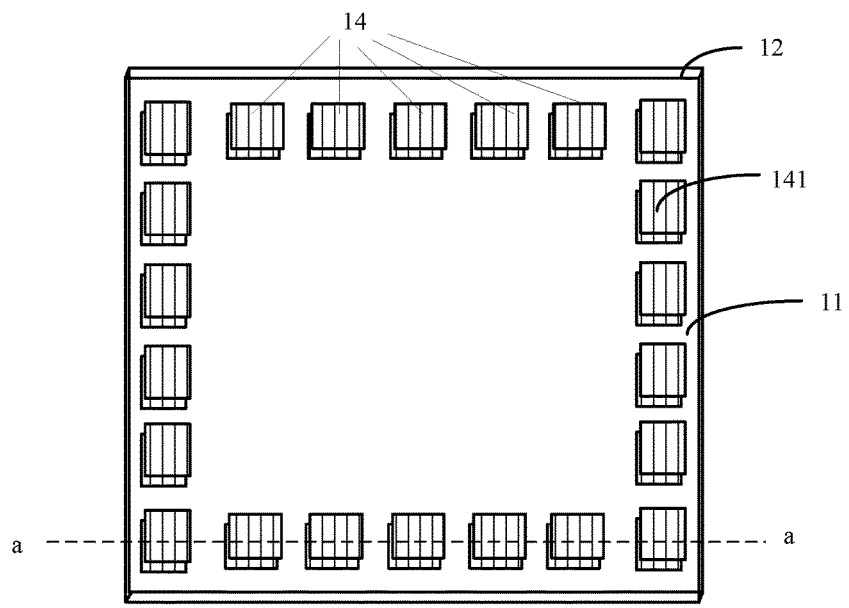
FIG. 4(a) is a top view for the polarization switching device in FIG. 3(c)
Figure 4B:
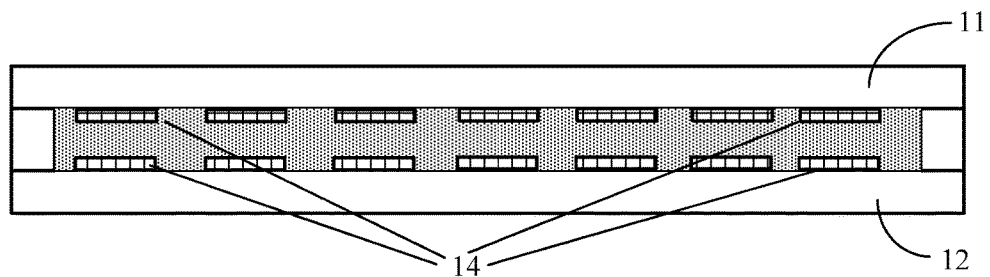
FIG. 4(b) is a sectional diagram along the cutting line a-a in FIG. 4(a)

In certain exemplary embodiments, based on the structure as shown in FIG. 3(c), and with reference to the top view of the polarization switching device as shown in FIG. 4(a), the conductive layer 14 on the surface of the first transparent substrate 11 comprises the same patter as the conductive layer 14 on the surface of the second transparent substrate 12. At this point, in conjunction with the sectional diagram along the cutting line a-a in FIG. 4(a) as shown in FIG. 4(b), the orthographic projection of the pattern of the conductive layer 14 on the surface of the first transparent substrate 11 onto the second transparent substrate 12 coincides with the pattern of the conductive layer 14 on the surface of the second transparent substrate 12. Thereby, the consistency of the electric field formed in the polarization switching device is ensured.

It should be noted that, to simplify views and facilitate understanding, other views do not show the electrical interface, except that the electrical interface is shown in FIG. 2. However, this does not represent that the electrical interface is not comprised in other schemes.

In certain exemplary embodiments, as shown in FIG. 4(a), the block electrodes 141 in the conductive layer 14 are uniformly arranged along edge regions. As such, the uniformity when the electric field is switched is ensured.

In addition, though disposed in edge regions, the conductive layer 14 will inevitably affect the aperture ratio of the polarization switching device. Therefore, to ensure the aperture ratio of the polarization switching device, in certain exemplary embodiments, the material used for the block electrodes is selected as transparent conductive material. In particular, it may be selected as transparent oxide, for example, indium tin oxide ITO.

Optionally, in an embodiment of the present disclosure, based on FIG. 3(a) and FIG. 3(b), a conductive layer is disposed on the surface of the first transparent substrate 11 or the surface of the second transparent substrate 12. At this point, thicknesses of block electrodes 141 are in range of 45 nm-55 nm along a direction (i.e., the y direction in the figure) perpendicular to the surface of the first transparent substrate 11, and widths (i.e., the x direction in the figure) of the edge region occupied by block electrodes are in a range of 35 nm-45 nm. For example, thicknesses of block electrodes 141 may be 50 nm, and widths may be 40 nm. Thereby, it can be avoided that the block electrodes 141 occupy excessive edge regions, and also the transmittance of the polarization switching device is ensured.

Likewise, based on FIG. 3(c), conductive layers 14 are disposed on both the first transparent substrate 11 and the second transparent substrate 12. At this point, thicknesses of block electrodes 141 are in a range of 25 nm-35 nm along a direction perpendicular to the surface of the first transparent substrate 11, and widths of the edge region occupied by block electrodes are in a range of 35 nm-45 nm. For example, thicknesses of block electrodes 141 may be 30 nm and widths may be 40 nm.

According to another implementation, the four side-plates are divided into two pairs, and the two side-plates of each pair are opposite to each other. Additionally, the first conductive layer comprises a plurality of first block electrodes and the plurality of first block electrodes are arranged on the inner surfaces of two opposite side-plates. Further, the second conductive layer comprises a plurality of second block electrodes and the plurality of second block electrodes are arranged on the inner surfaces of the other two opposite side-plates.

Figure 5A:
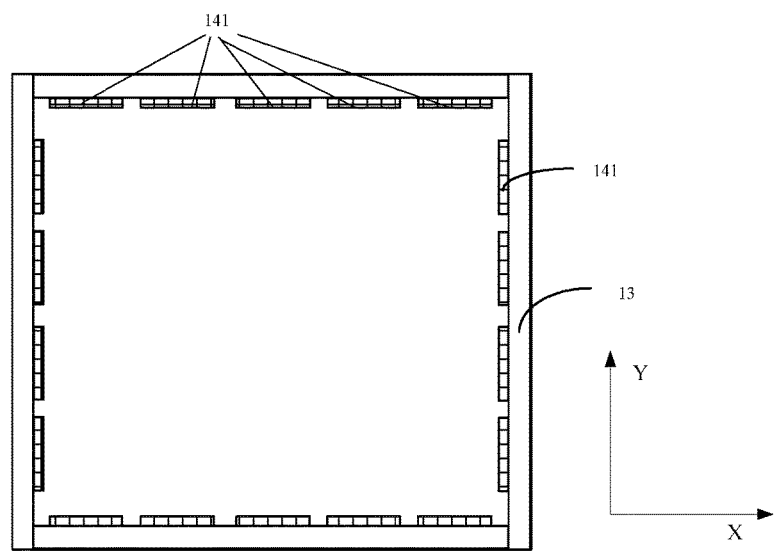
FIG. 5(a) is a top view for a polarization switching device according to another embodiment of the present disclosure.
Figure 5B:
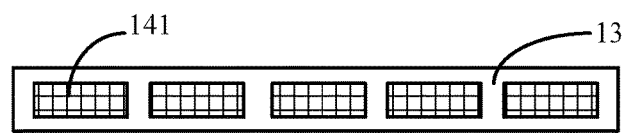
FIG. 5(b) is a schematic diagram for a side-plate 13 in the polarization switching device of FIG. 5(a)

In particular, with reference to the top view of a polarization switching device as shown in FIG. 5(a), the conductive layer 14 comprises a plurality of block electrodes 141, and the plurality of block electrodes 141 are arranged on the surfaces of the side-plates 13. In addition, with reference to the schematic diagram of a side-plate 13 in the polarization switching device as shown in FIG. 5(b), a plurality of block electrodes 141 are arranged on the side-plate 13, and these block electrodes 141 are disposed in a relatively regular arrangement. For example, in certain exemplary embodiments, they are disposed evenly and flushly. Thereby, it is ensured that the electric field may be adjusted uniformly. Moreover, by disposing the block electrodes on the side-plates, on one hand, switching between a plurality of directions of the electric field in the confined space can be achieved by means of the control terminal, and then switching between a plurality of polarization directions is achieved; and on the other hand, it is unnecessary to occupy an edge region of the surface of a substrate, and the transmittance of light is thus improved.

Figure 5C:
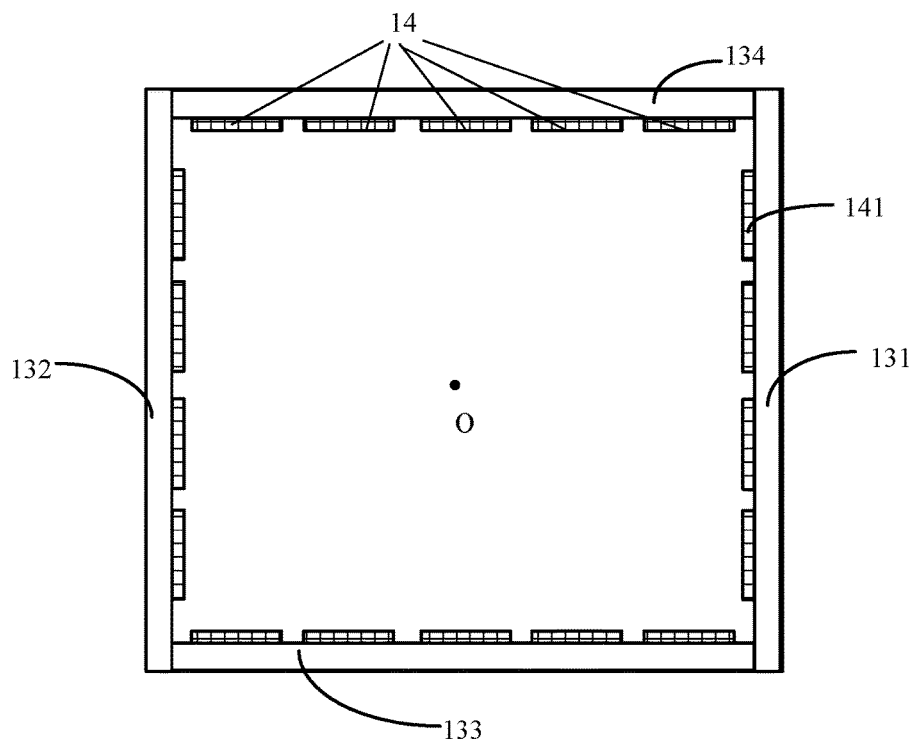
FIG. 5(c) is a top view for the polarization switching device of FIG. 5(a)

In certain exemplary embodiments, patterns of the conductive layers on the surfaces of any two side-plates disposed opposite to each other are disposed symmetrically with respect to the center of the confined space. With reference to the top view of the polarization switching device as shown in FIG. 5(c), conductive layers are disposed on the four side-plates of the polarization switching device respectively. In particular, the side-plate 131 and the side-plate 132 are disposed opposite to each other, while the side-plate 133 and the side-plate 134 are disposed opposite to each other. In addition, the pattern of the conductive layer 14 on the surface of the side-plate 131 and the pattern of the conductive layer 14 on the surface of the side-plate 132 are disposed symmetrically with respect to the center O of the confined space. Similarly, the pattern of the conductive layer 14 on the surface of the side-plate 133 and the pattern of the conductive layer 14 on the surface of the side-plate 134 are disposed symmetrically with respect to the center O of the confined space. Hence, it is ensured that the direction of the formed electric field is uniform and consistent, and it is convenient to adjust the direction of the electric field.

Optionally, in an embodiment of the present disclosure, with reference to FIG. 5(b), heights of the block electrodes 141 are in a range of 45 nm-55 nm along a direction perpendicular to the surface of the first transparent substrate. In certain exemplary embodiments, they are disposed at the middle position of the side-plate, and arranged in a flush manner. The thickness of the confined space is in a range of 80 nm-100 nm in a direction perpendicular to the surface of the first transparent substrate.

It should be noted that, in an embodiment of the present disclosure, the block electrodes 141 are uniformly arranged in edge regions of the first transparent substrate 11 and/or edge regions of the second transparent substrate 12. Alternatively, the block electrodes 141 are uniformly arranged on the inner walls of the side-plates. In addition, for the spacing between neighboring block electrodes 141, a reasonable value may be selected according to the actual commissioning. In this way, it is ensured that neighboring block electrodes 141 do not contact with each other, and the voltage interference between neighboring block electrodes 141 are avoided.

Optionally, in an embodiment of the present disclosure, in the confined space, the one-dimensional nanometer conductive material dispersed in the polymer fluid may be metal nanowire or carbon nanotube. In certain exemplary embodiments, the one-dimensional nanometer conductive material is columnar, and the diameter of the one-dimensional nanometer conductive material is in a range of 50 nm-70 nm. In particular, the one-dimensional nanometer conductive material is irregularly arranged in the confined space to which an electric field is not applied. After an electric field is applied, the long axis of the one-dimensional nanometer conductive material is arranged along the direction of the electric field. Precise control and adjustment of the direction of the electric field may be achieved by the patterned conductive layer disposed on an inner wall of the confined space and by reasonably selecting a combination of block electrodes to which voltages are applied, sizes of the voltages, and the density of the polymer fluid, etc.

Figure 6A:
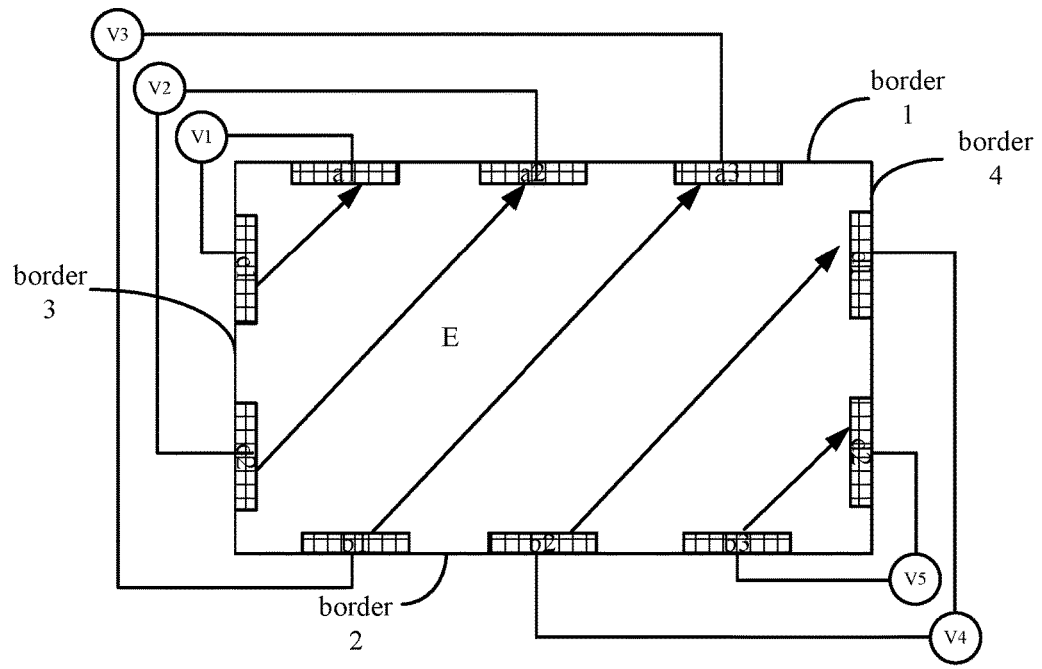
FIG. 6(a) is a schematic diagram for the principle of generating an electric field by applying a voltage to the polarization switching device.
Figure 6B:
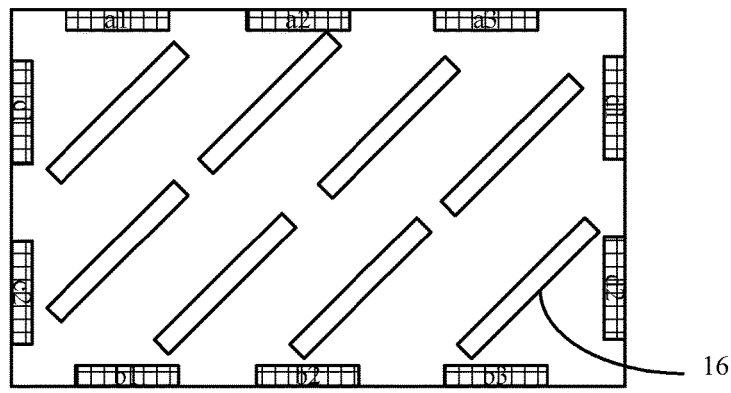
FIG. 6(b) is a structure diagram for an arrangement of the one-dimensional nanometer conductive material in the confined space along the electric field in FIG. 6(a)

Taking FIG. 6(a) as an example, a patterned conductive layer is disposed on inner walls of the confined space in the polarization switching device. In particular, block electrodes a1, a2, a3 are disposed on a border 1, and block electrodes b1, b2, b3 are disposed on the opposed border 2. Alternatively, block electrodes c1, c2 are disposed on a border 3, and block electrodes d1, d2 are disposed on the opposed border 4. In an achievable setting for electric field, a voltage V1 is applied to a1 and c1, a voltage V2 is applied to a2 and c2, a voltage V3 is applied to a3 and b1, a voltage V4 is applied to d1 and b2, and a voltage V5 is applied to d2 and b3. Considering the symmetrical setting, the size of V1 may be equal to that of V5, and likewise, V2 may be equal to V4. In particular, in the principle diagram for applying voltages as shown in FIG. 6(a), the lead wires and the applied voltages should be optimized according to a certain mode of wiring. However, a schematic depiction is done in the figure only for the convenience of understanding. As such, a tilted electric field is formed between inner walls of the confined space. Thereby, the one-dimensional nanometer conductive material 16 dispersed disorderly in the confined space is arranged along the direction of the formed electric field, and eventually forms a structure as shown in FIG. 6(b). Considering that the diameter of the one-dimensional nanometer conductive material is close to the thickness of the confined space in range, the one-dimensional nanometer conductive material may form a structure similar to a grating. When light enters the structure, the light vector vibrating parallel to the long axis direction of the one-dimensional nanometer conductive material is absorbed, whereas the light vector vibrating perpendicular to the long axis direction of the one-dimensional nanometer conductive material transmits. Thereby, the polarization switching function is achieved.

Figure 6C:
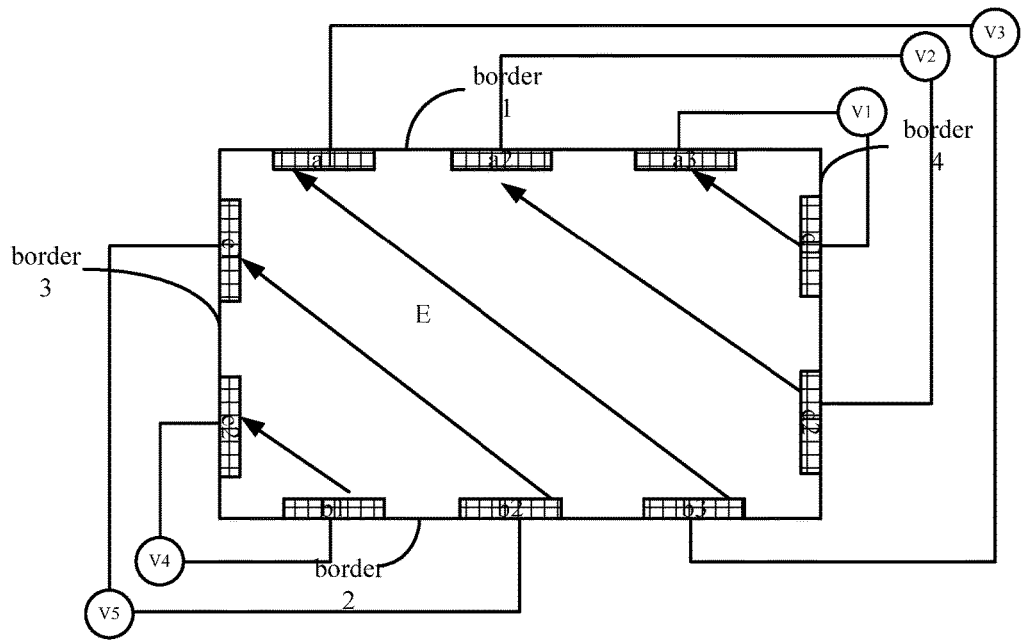
FIG. 6(c) is a schematic diagram for the principle of generating another electric field by applying another voltage to the polarization switching device.

In addition, with reference to FIG. 6(c), it may further be possible to adjust the direction and size of the voltage applied to the conductive layer. That is, a voltage V1 is applied to a3 and d1, a voltage V2 is applied to a2 and d2, a voltage V3 is applied to a1 and b3, a voltage V4 is applied to c1 and b2, and a voltage V5 is applied to c2 and b1. Thereby, an electric field of a preset direction is formed in the confined space. Thus, the one-dimensional nanometer conductive material 16 dispersed disorderly in the confined space is arranged along the direction of the formed electric field, and forms a structure as shown in FIG. 6(d).

It is thus clear that the one-dimensional nanometer conductive material in the confined space may be deflected with the change of the electric field. Thereby, a polarization switching device with a different angle of light transmission is formed.

In certain exemplary embodiments, in the confined space, the direction of a horizontal electric field can be changed in a range of 0°-180°. In fact, by setting the block electrodes to be infinitely small, a greater adjustment range for the direction of the electric field may be achieved. Thereby, a range of polarization angle of 0°-180° can be achieved for the polarization switching device. In addition, the horizontal electric field in the confined space may further be a component of an electric field. That is, the generated electric field has a certain tilted angle in a direction perpendicular to the surface of a substrate. As such, the one-dimensional nanometer conductive material will also be arranged to be at an angle with respect to the horizontal direction correspondingly. Nevertheless, viewed from the surface of the substrate, the one-dimensional nanometer conductive material in the whole confined space will still form a structure similar to a grating as a whole.

In addition, an embodiment of the present disclosure further provides a display apparatus. With reference to FIG. 7, the display apparatus comprises: a liquid crystal display panel 21 and two polarization switching devices involved in any of the above described schemes. In these two polarization switching devices, the polarization switching device 22 is located on the light output surface of the liquid crystal display panel 21, and the polarization switching device 23 is located on the light input surface of the liquid crystal display panel 21.

In this scheme, by a control terminal(s) controlling the direction of the electric field to change in the polarization switching device, adjustment of the light transmission angle of the polarization switching device may be achieved. In turn, by the fact that the light transmission angle of the polarization switching device is adjustable, the purpose that the viewing angle of the display apparatus is adjustable in range may be achieved. For example, switching between the range of normal viewing angle and the range of anti-peeping viewing angle is achieved.

In certain exemplary embodiments, as shown in FIG. 8, the display apparatus further comprises: a viewing angle compensation film 24 disposed on the outer surface of any of the polarization switching devices. In the figure, the viewing angle compensation film 24 is disposed on the outer surface of the polarization switching device 22. Of course, the viewing angle compensation film 24 may further be disposed on the outer surface of the polarization switching device 23, which is not shown in the present disclosure.

Optionally, in an embodiment of the present disclosure, the light transmission angle of the polarization switching device is in a range of 0°-180°. However, in the display apparatus, the two polarization switching devices may have a fixed angle of 90° therebetween, in order to implement display. In a specific implementation, angle settings for the two polarization switching devices are selected as one of the following: the light transmission angle of the polarization switching device located on the light output surface is 15°, whereas the light transmission angle of the polarization switching device located on the light input surface is 105°; the light transmission angle of the polarization switching device located on the light output surface is 165°, whereas the light transmission angle of the polarization switching device located on the light input surface is 75°; the light transmission angle of the polarization switching device located on the light output surface is 0°, whereas the light transmission angle of the polarization switching device located on the light input surface is 90°; and the light transmission angle of the polarization switching device located on the light output surface is 45°, whereas the light transmission angle of the polarization switching device located on the light input surface is 135°. In the above description, the light transmission angle refers to a light transmission angle in a plane parallel to the surface of the first transparent substrate.

It is thus clear that the display apparatus involved in the present application may not only achieve switching between the range of normal viewing angle and the range of anti-peeping viewing angle, but also achieve continuous switching between individual angles.

In addition, with respect to the polarization switching device, the present application further provides a driving method for the polarization switching device.

With reference to FIG. 9, the method mainly comprises step 31 of adjusting the voltages for the first conductive layer and the second conductive layer, such that a parallel electric field is generated in the confined space. In certain exemplary embodiments, the step of adjusting the voltages for the first conductive layer and the second conductive layer specifically comprises: switching between different voltage ports for the first conductive layer and the second conductive layer via the control terminals, or adjusting the voltages for the first conductive layer and the second conductive layer via the control terminals. In step 31, the voltages applied to individual block electrodes are adjusted by the control terminals. In particular, an adjustment scheme may be to keep the voltage ports connected to the individual block electrodes unchanged and adjust the voltages of the individual voltage ports in size, so as to achieve switching of the direction of the electric field in the confined space. Moreover, the ultimate purpose of the adjustment is to cause the direction of the electric field in the confined space to be consistent. That is, it is required for one adjustment to adjust the voltages applied to the block electrodes in the whole confined space.

The method may further comprise step 32 of deflecting the long axis of the one-dimensional nanometer conductive material in the confined space by changing the direction of the electric field. The step 32 causes the one-dimensional nanometer conductive material to be orderly deflected. Thereby, it can be ensured that the light transmission angle of the polarization switching device is switchable. The specific switching may be continuous switching or discontinuous switching.

Although optional embodiments of the present disclosure have been described, further alterations and modifications to these embodiments may be made by those skilled in the art, once he knows the basic creative concept. Therefore, the appended claims are intended to be construed as comprising the optional embodiments and all the alterations and modifications which fall within the scope of the present disclosure.

Clearly, various changes and variations to the present disclosure may be made by the skilled in the art without departing from the spirit and scope of the present disclosure. Thus, if these modifications and variations to the present disclosure pertain to the scope of the claims and their equivalents of the present disclosure, the present disclosure is also intended to encompass these changes and variations.

The invention claimed is:

1. A polarization switching device, comprising:
    a first transparent substrate;
    a second transparent substrate arranged opposite to the first transparent substrate;
    four side-plates that define a confined space together with the first transparent substrate and the second transparent substrate;
    a first conductive layer and a second conductive layer arranged on inner surfaces of the four side-plates, wherein the first conductive layer and the second conductive layer are configured to generate an electric field in the confined space;
    transparent polymer fluid filled in the confined space; and
    one-dimensional nanometer conductive material dispersed in the transparent polymer fluid,
    wherein a long axis of the one-dimensional nanometer conductive material is deflected as a direction of the electric field changes in the confined space,
    wherein the four side-plates are divided into two pairs, and two side-plates of each pair are opposite to each other;
    the first conductive layer comprises a plurality of first block electrodes and the plurality of first block electrodes are arranged on inner surfaces of two opposite side-plates; and
    the second conductive layer comprises a plurality of second block electrodes and the plurality of second block electrodes are arranged on inner surfaces of the other two opposite side: plates.

2. The polarization switching, device as claimed in claim 1, further comprising: an electrical interface, a first control terminal and a second control terminal connected with the electrical interface; wherein
    the first control terminal is configured to control the first conductive layer via the electrical interface, and
    the second control terminal is configured to control the second conductive layer via the electrical interface.

3. The polarization switching device as claimed in claim 1, wherein the first and second block electrodes are both made of transparent conductive material.

4. The polarization switching device as claimed in claim 1, wherein
the plurality of first block electrodes are arranged on inner surfaces of one and the other of two opposite side-plates in a symmetrical manner; and
the plurality of second block electrodes are arranged on inner surfaces of one and the other of the other two opposite side-plates in a symmetrical manner.

5. The polarization switching, device as claimed in claim 1, wherein heights of the first block electrodes and the second block electrodes are both in a range of 45 nm-55 nm in a direction perpendicular to a surface of the side-plates.

6. The polarization switching device as claimed in claim 1, wherein thicknesses of the confined space are in a range of 80 nm-100 nm in a direction perpendicular to a surface of the first transparent substrate.

7. The polarization switching device as claimed in claim 1, wherein the one-dimensional nanometer conductive material comprises metal nanowire or carbon nanotube.

8. The polarization switching device as claimed in claim 1, wherein
the one-dimensional nanometer conductive material is columnar, and
a diameter of the one-dimensional nanometer conductive material is in a range of 50 nm-70 nm.

9. The polarization switching device as claimed in claim 1, wherein the direction of the electric field in the confined space changes in a range of 0°-180° in a plane parallel to a surface of the first transparent substrate.

10. A display apparatus, comprising:
a liquid crystal display panel; and
two polarization switching devices,
wherein of the two polarization switching devices, one is located on a light output surface of the liquid crystal display panel, and the other is located on a light input surface of the liquid crystal display panel,
wherein each of the polarization switching deices comprises:
a first transparent substrate;
a second transparent substrate arranged opposite to the first transparent substrate;
four side-plates that define a confined space together with the first transparent substrate and the second transparent substrate;
a first conductive layer and a second conductive layer arranged on inner surfaces of the four Side-plates, wherein the first conductive layer and the second conductive, layer are configured to generate an electric field in the confined space;
transparent polymer fluid filled in the confined space; and
one-dimensional nanometer conductive material dispersed in the transparent polymer fluid,
wherein a long axis of the one-dimensional nanometer conductive material is deflected as a direction of the electric field changes in the confined space,
wherein the four side-plates are divided into two pairs and two side-plates of each pair are opposite to each other;
the first conductive layer comprises a plurality of first block electrodes and the plurality of first block electrodes are arranged on inner surfaces of two, opposite side-plates; and
the second conductive layer comprises a plurality of second block electrodes and the plurality of second block electrodes are arranged on inner surfaces of the other two opposite side-plates.

11. The display apparatus as claimed in claim 10, further comprising: a viewing angle compensation film on an outer surface of any one of the two polarization switching devices.

12. The display apparatus as claimed in claim 10, wherein angle settings for the two polarization switching devices are selected as one of the following:
the polarization switching device located on the light output surface allows transmission of light with a polarization angle of 15°, whereas the polarization switching device located on the light input surface allows transmission of light with a polarization angle of 105°;
the polarization switching device located on the light output surface allows transmission of light with a polarization angle of 165°, whereas the polarization switching device located on the light input surface allows transmission of light with a polarization angle of 75°;
the polarization switching device located on the light output surface allows transmission of light with a polarization angle of 0°, whereas the polarization switching device located on the light input surface allows transmission of light with a polarization angle of 90°; and
the polarization switching device located on the light output surface allows transmission of light with a polarization angle of 45°, whereas the polarization switching device located on the light input surface allows transmission of light with a polarization angle of 135°,
wherein the polarization angle refers to a polarization angle in a plane parallel to a surface of the first transparent substrate.

13. A method for driving the polarization switching device as claimed in claim 1, comprising:
adjusting voltages for the first conductive layer and the second conductive layer, such that a parallel electric field is generated in the confined space; and
deflecting the long axis of the one-dimensional nanometer conductive material in the confined space by changing the direction of the electric field.

14. The method as claimed in claim 13, wherein the step of adjusting voltages for the first conductive layer and the second conductive layer comprises:
switching between different voltage ports for the first conductive layer and the second conductive layer via control terminals, or
adjusting the voltages for the first conductive layer and the second conductive layer via control terminals.

* * * * *